Figure 1:
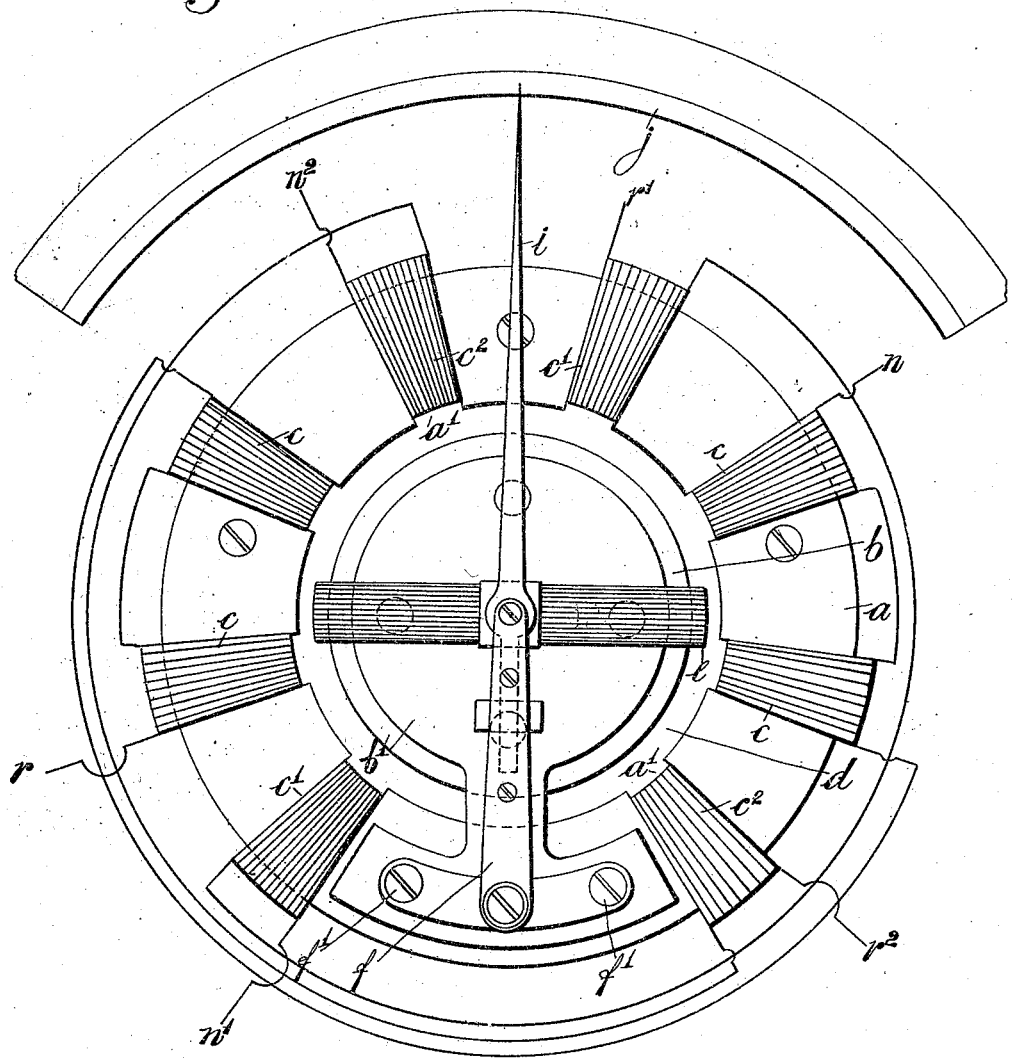

No. 872,474. PATENTED DEC. 3, 1907.
W. E. SUMPNER.
ELECTRICAL MEASURING INSTRUMENT.
APPLICATION FILED OCT. 19, 1905.

4 SHEETS—SHEET 1.

Witnesses
Thomas Durant
Mabelle W. Church

Inventor
William E. Sumpner
By Church & Church
Attorneys

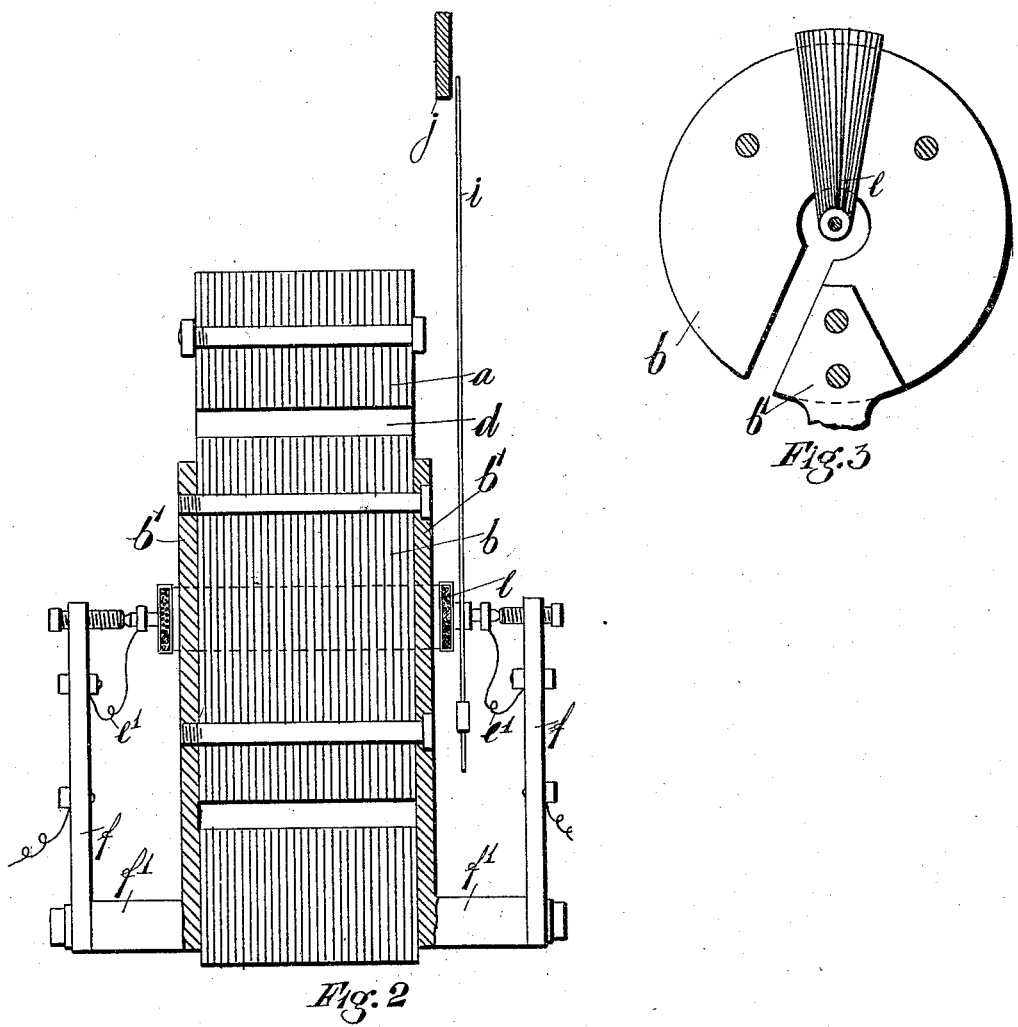

No. 872,474. PATENTED DEC. 3, 1907.
W. E. SUMPNER.
ELECTRICAL MEASURING INSTRUMENT.
APPLICATION FILED OCT. 19, 1905.

4 SHEETS—SHEET 4.

Witnesses:
Elizabeth Griffith
Melville D. Church

Inventor:
William E. Sumpner
by Church & Church
His Attys

UNITED STATES PATENT OFFICE.

WILLIAM EDWARD SUMPNER, OF BIRMINGHAM, ENGLAND.

ELECTRICAL MEASURING INSTRUMENT.

No. 872,474. Specification of Letters Patent. Patented Dec. 3, 1907.

Application filed October 19, 1905. Serial No. 283,445.

*To all whom it may concern:*

Be it known that I, WILLIAM EDWARD SUMPNER, a citizen of the British Empire, and a resident of Birmingham, in Warwickshire, England, have invented certain new and useful Improvements in Electrical Measuring Instruments; and I do hereby declare the following to be a full, clear, and exact description of the same, reference being had to the accompanying drawings, forming a part of this specification, and to the figures and letters of reference marked thereon.

This invention relates to power factor indicators, that is to instruments designed to indicate the power factor, or phase relation between current and voltage in an alternating electric circuit, whether the circuit be single phase, two phase or three phase. In the instruments hitherto usually made for such purposes the magnetic fields set up by the currents are weak, and the forces exerted on the moving parts of the instrument are feeble. As a consequence these instruments have to be delicately constructed, and are easily affected by external magnetic fields.

The object of the present invention is to provide instruments free from these defects, by applying to them the well known principle of a strong rotating magnetic field acting across a narrow air gap between iron masses.

Instruments constructed in accordance with this invention operate by the interaction of a rotating magnetic field whose frequency and phase depend upon one of the two quantities, and an alternating current whose frequency and phase depend upon the other of the two quantities, whose phase relation is to be indicated. For example, in an instrument constructed in accordance with this invention a strong rotating magnetic field may be produced in the manner exemplified in the well known single phase and multiphase induction motors. The iron parts of the instrument may consist of an inner and an outer portion as in induction motors, but whereas in such motors the outer portion, or stator is fixed and the inner portion, or rotor, is capable of rotation, the instrument now described may be constructed with both iron parts like stators fixed in position. Only one of these stators, preferably the outer one, need be wound for the purpose of producing the rotating field. The stators are well laminated as usual to diminish eddy currents, and may be built up of thin stampings shaped as disks, and rings respectively, the latter surrounding the former and concentric with them. The two sets of stampings may be made up into cylindrical blocks and suitably fixed so as to have a common axis, while leaving between the two stators an annular air gap in which the moving parts of the instrument can turn. These moving parts comprise one or more coils which may be rectangular in shape and which form a single moving system. The axis of revolution of the moving system is the same as the common axis of the stators. The coils when rectangular are so constructed that two opposite sides have the same length as the diameter of the annular air gap, while the other two sides are parallel to the axis and the greater part of their lengths move in this air gap, which gap should be made as narrow as possible consistent with the necessary freedom of motion of the moving system.

The current through the moving coil or coils may be produced either by the currents through the mains, or by the voltages across them, the former if the stator or stators are wound for the voltages, and the latter if the stator or stators are wound for the currents.

The winding of the stator or stators is arranged to suit the circuit for which the instrument is intended, and is in connection with this circuit either directly, or through the medium of suitable transformers. The winding must consist of at least two sets of coils traversed by currents in suitable phase relation to one another. For a three phase circuit it may consist of three similar windings symmetrically spaced as in ordinary three phase motors, and traversed by three phase currents produced either by the voltages across the mains of the circuit, or by the currents through these mains. If, now, the moving system be free and one of the coils forming the moving system be traversed by a current of the same frequency as that of the rotating field, the coil will take up a definite position depending merely upon the phase relation of the current through it to the rotating field, and which will in the absence of extraneous disturbing forces be independent of the strength of this current, or of the strength of the rotating field in which the coil moves. A pointer attached to the moving system will indicate on a suitable calibrated scale fixed to the outer stator, the phase relation of the current tested. The moving system is balanced and quite free to move it is not provided with a spring or other form of control, tending to bring it to a definite position on the scale.

If the moving coil forms part of a circuit common to the secondary circuits of two current transformers, the primaries of which are placed in two of the mains of a three phase system, it is advantageous to use on the secondary of these transformers a reversing switch, so constructed that there is an interval of short circuit during reversal. This makes it possible to provide the instrument conveniently with two scales, one for reading high power factors, and the other for low power factors, the scale to be used depending on the position of the reversing switch. A similar device can be used when the moving coil forms part of a circuit including in series the secondaries of two voltage transformers, the primaries of which are put across two of the voltages of three phase mains. The reversing switch on one of the secondaries of the transformers should in this case be such that there is an interval of open circuit during reversal, these devices being more fully described hereafter.

In the accompanying drawings—Figures 1 and 2 are, respectively, front and sectional side elevations of a phase meter constructed in accordance with this invention. Fig. 3 is a diagram showing a modified form of moving coil and inner stator. Figs. 4 to 7, inclusive, are diagrams illustrating various applications of the instruments.

The form of instrument illustrated in Figs. 1 & 2 of the accompanying drawings comprises an outer stator $a$ having holes or slots $a_1$ for the windings and an inner stator $b$ which is left unwound. The windings are indicated at $c$, $c_1$, $c_2$, and the ends of the coils are shown respectively at $v\ n$, $v'\ n'$, $v^2\ n^2$. The coils may be joined up in any ordinary and suitable manner to the multiphase circuit. These windings together with the iron stators constitute a stationary multiphase electromagnet, that is to say, an iron-cored magnetic system of which all the iron appreciably affecting the total magnetic flux is fixed, and magnetized by two or more windings secured to the iron. The windings are supplied with a corresponding number of currents all differing in phase, and the iron stators together with the air gap serve to provide a distinct magnetic circuit for each winding, thus producing what is called a rotating magnetic field as in an ordinary induction motor. The stators are so dimensioned and assembled as to provide a minimum air gap $d$ for the moving coil $e$. By minimum air gap, is meant an air gap of dimensions sufficient only to permit the freedom of motion to the moving coil $e''$. By this means I obtain all the advantage, in the way of a strong field, accruing to the use of a practically closed iron magnetic circuit, and yet avoid the great disadvantage of having a heavy moving system, the strong force due to the strong field being exerted on a light moving system of conductors which need not carry any iron at all, and which will operate when carrying currents so small that they do not appreciably affect the field of the multiphase electromagnet. The moving coil $e$ is pivotally supported by the insulated bars $f$ secured to the outer stator $a$ by bolts $f_1$. Current is led into and out from the moving coil in any convenient manner such for example as by fine wires $e'$, exerting no appreciable control on the system. A pointer $i$ serves to indicate on a scale $j$ the movement of the coil $e''$. The mode of supporting the inner stator $b$ is clearly shown in the drawings. The inner stator $b$ is secured by end plates $b'$ to the outer stator $a$, the said plates being formed with neck portions sufficiently narrow to permit as large a range of movement as possible to the moving coil $e$.

Fig. 3 illustrates a construction by which an almost complete rotation of the coil $e$ can be obtained. One edge of the coil $e$ is formed coincidently with the axis of revolution. The inner stator $b$ is gapped to enable the coil to be placed in position. Both coil $e$ and stator $b$ are mounted similarly to the corresponding parts shown at Figs. 1 and 2.

Figure 4:
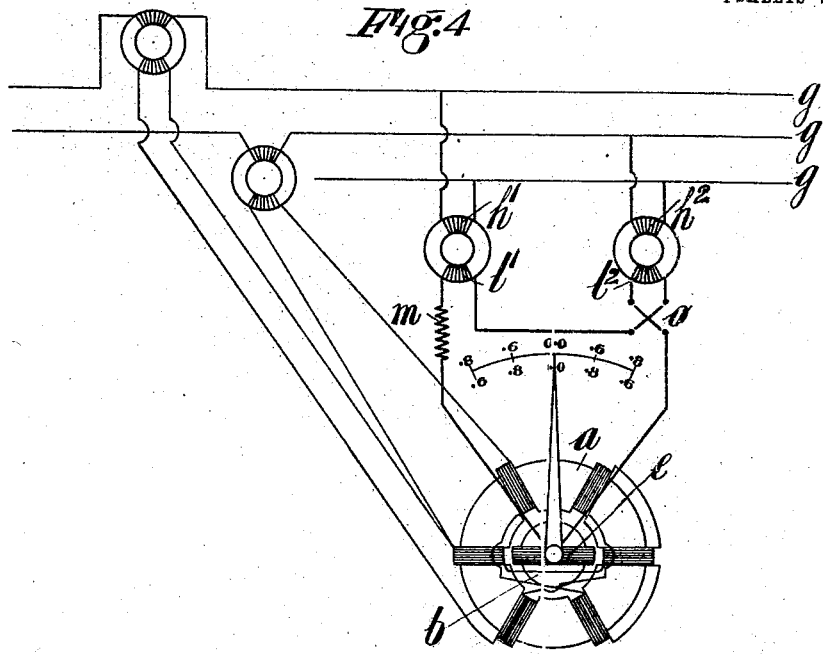
Figure 5:
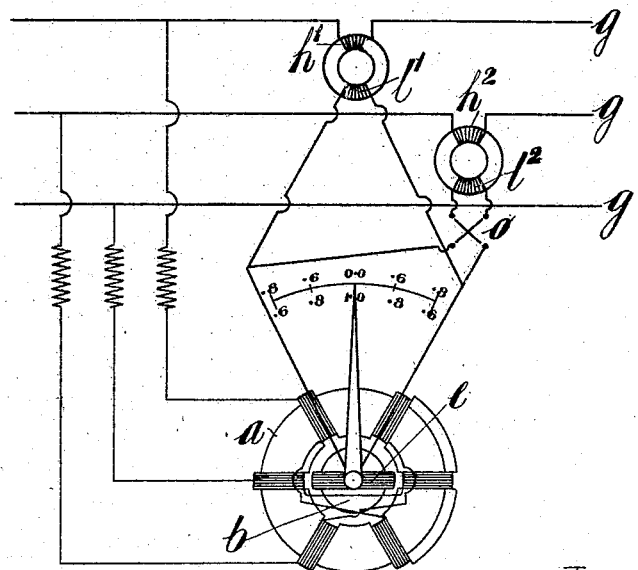
Figure 6:
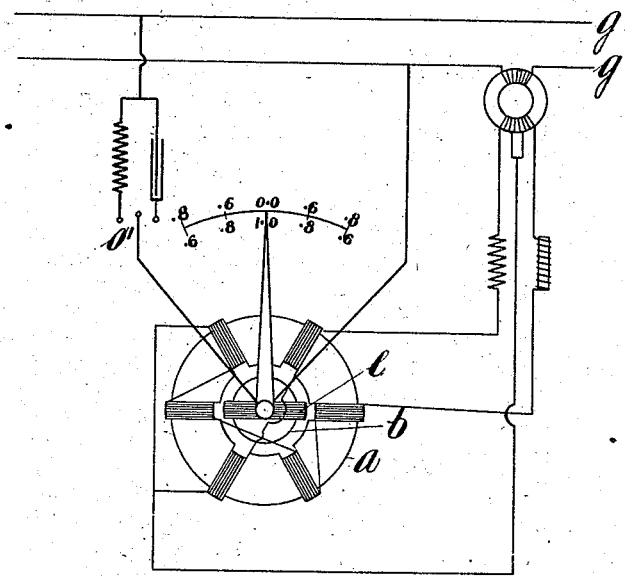

In Fig. 4 is shown one mode of connecting a reversing switch for the purpose hereinbefore referred to i. e. to enable the same instrument to be employed for reading either high or low power factors. $g\ g\ g$ represent the three mains of a three phase circuit. $h_1$ and $h_2$ are the primary coils of two transformers whose secondaries $l_1$ and $l_2$ are connected in series through a non-inductive resistance $m$, the moving coil $e$ and a reversing switch $o$. The function of the switch $o$ is to reverse the connections of one of the two secondaries, in this case $l_2$, although it might be equally well applied to $l_1$ instead. By this means the scale over which the pointer attached to the coil $e$ moves has two different meanings, corresponding with the two positions of the switch $o$. Two scales, each corresponding with one position of the switch, are preferably provided. The reversal of connections affected by the switch $o$ serves to change, by a definite and fixed amount the phase of the current in moving coil $e$. A similar result may be obtained by employing current transformers instead of voltage transformers, the connection to the coil $e$ being then as indicated by Fig. 5. Further the same result may also be obtained when the instrument is used on a single phase circuit, by substituting through the medium of a two way switch $o'$, as shown at Fig. 6 a condenser, and a non-inductive resistance, for one another alternately, in series with the moving coil. The windings of the electromagnet may be arranged in any ordinary and suitable manner as hereinbefore stated to receive current from either a single phase or a multiphase circuit. Whereas in a multiphase induction motor the windings are symmetrical I find in my instrument that it is not necessary that they should be either symmetrical or symmetrically spaced on the magnet, since variations in the distribution of the windings and in the relation of the ampere turns of one set to those of another will vary the calibration of the instrument. Windings as shown in Figs. 1 and 2 specially arranged to thus depart from the symmetry usually found in multiphase motors I designate dissymmetrical windings, to indicate that the two or more sets of windings have either an uneven space distribution, or an unequal number of ampere turns, or a combination of these two qualities. It is desirable to make use of such windings when the most important scale readings would otherwise be too crowded together, in order to produce such a distribution of scale markings as best suits the purpose in hand. In a single phase instrument variation of the mutual phase relationship of the currents in the windings produces a like effect.

Figure 7:
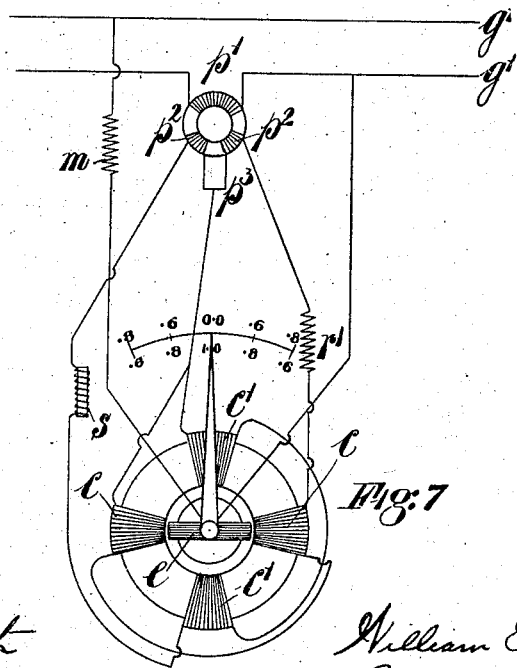

In Fig. 7 is shown one mode of supplying suitable currents to a multiphase electromagnet from a single phase circuit. In this diagram wherein only four magnet windings are shown for simplicity of illustration $p_1$ is the primary of a current transformer inserted in one of the single phase mains $g_1$. $p_2$ are two secondaries in the primary $p_1$, and have two ends connected together at $p_3$. The other ends are connected together through a non-inductive resistance $r_1$ one set of windings $c$ of the multiphase electromagnet and a choking coil $s$. The second set of magnet windings $c_1$ is connected to the point of junction of $c$ & $s$ and to the point $p_3$ of direct junction of the two secondaries $p_2$. These two secondaries thus coöperate with the electromagnet to produce a rotating field since the coil $c_1$ receives a current displaced in phase relatively to that in $c$. $c_1$ receives the difference between the currents in the two secondaries while $c$ receives the current from one secondary. The two secondaries may be formed by the two portions of a single winding having a point therein tapped for the junction $p_3$, or they may be the secondaries of two distinct transformers and be each energized by its own primary. In such case the two primaries must be similarly excited, from the same source, that is, if current transformers they must carry the same current and if potential transformers the same potential or currents or potentials proportional to and in phase with one another.

Finally, various modifications may be made by those skilled in the art, in the above described constructions and connections, without departing from the spirit and scope of this invention.

The above described constructions are given by way of illustration and such modifications, for example, as the use of moving coils of other than rectangular shape, or of stators of various shapes, or of any well known means to produce a rotating field, may be made, as will readily be understood by those skilled in the art.

In Figs. 4, 5, 6 and 7 only a few stationary magnet windings have been shown for clearness of illustration. In practice the number and arrangement of the slots and windings employed would preferably be as in Fig. 1, and the windings would be correspondingly connected.

Having now particularly described and ascertained the nature of my said invention and in what manner the same is to be performed, I declare that what I claim is:—

1. An instrument for indicating electrical phase relations comprising a stationary multiphase iron cored electromagnet having a narrow air gap, a conductor capable of movement in the said air gap, and means for supplying the conductor with current whose phase relation with the rotary field is in correspondence with the phase relation to be indicated, substantially as set forth.

2. An instrument for indicating electrical phase relations comprising an outer iron core, an inner iron core, a conductor capable of movement in the air gap between the cores, means for producing in such air gap a rotary field whose frequency and phase depend on one of the two quantities whose phase relation is to be indicated, and means for supplying the movable conductor with a current whose frequency and phase depend upon the other of such quantities substantially as set forth.

3. An instrument for indicating electrical phase relations comprising a stationary multiphase iron cored electromagnet adapted to produce a rotary magnetic field, a conductor capable of movement in the said rotary field, means for supplying the conductor with current whose phase relation with the rotary field is in correspondence with the phase relation to be indicated, and means for changing by a definite amount the mutual phase relationship of the field and the current in the conductor substantially as set forth.

4. An instrument for indicating electrical phase relations, comprising an outer iron core, an inner iron core, a conductor capable of movement in the air gap between the cores, coils which when appropriately energized produce in such air gap a rotary field whose frequency and phase depend on one of the two quantities whose phase relation is to be indicated, means for supplying the movable conductor with a current whose frequency and phase depend upon the other of such quantities and means for changing by a definite amount the mutual phase relationship of the produced field and the current in the movable conductor substantially as set forth.

5. An instrument for indicating electrical phase relations, comprising an outer iron core, an inner iron core, a conductor capable of movement in the air gap between the cores, coils which when appropriately energized produce in such air gap a rotary field, whose frequency and phase depend on one of the two quantities whose phase relation is to be indicated, means for supplying the coils with currents corresponding in frequency and phase with the currents in the mains of a multiphase system, transformers having their primaries connected respectively across such mains, a non-inductive resistance joined in series with the secondaries of the said transformers and with the movable conductor and a reversing switch substantially as and for the purpose set forth.

6. An instrument for indicating electrical phase relations comprising an inner iron core, an outer iron core, a conductor capable of movement in the air gap between the cores, dissymmetrical coils which when appropriately energized produce a rotary field in such air gap, and means for supplying the movable conductor with current whose phase relationship with the produced rotary field is in correspondence with the phase relationship to be indicated substantially as set forth.

7. An instrument for indicating electrical phase relations comprising an annular laminated outer iron core, an inner laminated iron core concentric therewith, passages in said outer core, a conductor capable of movement in the air gap between the cores, coils in said passages which when appropriately energized produce in such air gap a rotary field whose frequency and phase depend on one of the two quantities whose phase relation is to be indicated, and means for supplying the movable conductor with a current whose frequency and phase depend on the other of such quantities substantially as set forth.

In testimony whereof I have signed my name to this specification in the presence of two subscribing witnesses.

WILLIAM EDWARD SUMPNER.

Witnesses:
  E. M. WEBB,
  SIDNEY GEO. WEBB.